Patented Aug. 14, 1934

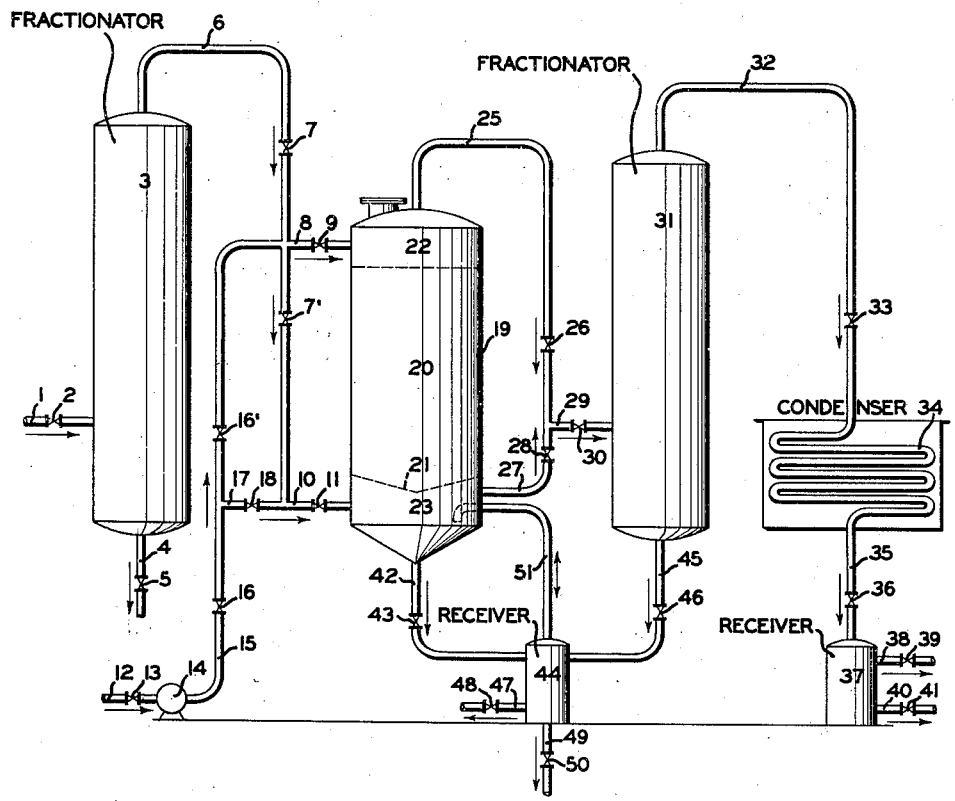

1,970,282

UNITED STATES PATENT OFFICE 1,970,282

TREATMENT OF HYDROCARBON OILS

Roland B. Day, Chicago, Ill., assignor to Universal Oil Products Company, Chicago, Ill., a corporation of South Dakota Application February 6, 1932, Serial No. 591,274

8 Claims. (Cl. 196—36)

This invention relates to the treatment of hydrocarbon oils and refers more particularly to the treatment of cracked distillates though corresponding straight run distillates may also be treated.

In a more specific sense the invention is concerned with the treatment of relatively low boiling hydrocarbon oil mixtures in heated vaporous condition as they occur in the fractionating stage of cracking processes or in the primary distillation of crude petroleum and to some extent with those originating from secondary or rerunning operations.

The present invention is primarily concerned with vapor phase treating processes as a result of which gasolines are produced which possess sufficiently low gum and sulphur content along with good color and color stability to render them utilizable as motor fuel. In this respect the process is differentiated from the process commonly used in the petroleum industry of producing such gasolines by chemical treatment in liquid phase of distillates containing substantial percentages of gasoline followed by neutralization and rerunning of the treated distillates to produce end point gasoline.

In co-pending applications I have disclosed a general method for treating hydrocarbon oil vapors containing undesirably large percentages of gum-forming constituents, whereby said constituents are reduced to a point consistent with the production of a stable gasoline. The general method disclosed consists in treating unsaturated distillates in heated vaporous condition with halogen acids, particularly hydrochloric acid, in the presence of contact materials such as certain finely divided metals and their alloys, using in addition oxidizing gases when found expedient. Of the metals previously disclosed zinc and copper are of general applicability and I have shown that brasses as well as various other alloys containing metals of both an electropositive and electronegative character possess at times superior advantages over simple mixtures.

Among the aims and objects of the present invention is the provision of cheaper contact materials of the same or greater efficiency than those already disclosed but which operate to produce chemical treatments of the same nature. As a further object materials are used which are equivalent to metals mixed with or deposited upon relatively inert carrying materials as spacing agents. These present advantages will be brought out more in detail in later paragraphs.

In one specific embodiment the invention comprises treating hydrocarbon oil vapors with hydrochloric acid and/or other halogen acid and contacting the mixture with natural ores of copper, zinc and lead.

In the preferred embodiment the invention comprises adding hydrochloric acid either as a gas or an aqueous solution to cracked vapors, passing the mixture through a stationary bed of selected ore, separating liquid and vaporous reaction products and fractionating and condensing the vapors to produce a refined gasoline.

The attached diagrammatic drawing shows an arrangement of equipment suitable for effecting treatments characteristic of the process and has been provided for convenience in clarifying the concept of the invention.

Referring to the drawing, hydrocarbon vapors from any source may be admitted to a primary fractionator 3 from a supply line 1 containing control valve 2. This fractionator may constitute an element of the cracking plant, a portion of straight run crude oil distilling equipment or similar towers used in rerunning operations. The entering vapors are preferably fractionated to produce overhead cuts of approximate gasoline boiling range and residual refluxes which may be returned to the distilling or cracking zone or disposed of by pumping to storage, a line 4 containing control valve 5 being provided for their withdrawal.

Vapors of approximate gasoline boiling point range suitable for vapor phase treatment may be passed through a line 6 containing control valves 7 and 7' to a treater 19 which contains a stationary mass of any particular ore or mixture of ores suitable for serving as contact material in the treatment of the vapors. Such a body of contact material may be comprised within the space 20 and be supported upon a perforated false bottom 21, the upper limit of the mass being shown by the upper dotted line which bounds upper vapor space 22. Similarly the perforated support marks off lower vapor space 23.

Depending upon the character of the vapors undergoing treatment and the degree of refining desired and other factors, the incoming vapors may be passed either upwardly or downwardly through the contact mass. In the latter event they may be passed through branch line 8 containing control valve 9 with valve 7' closed and in the former event valve 9 may be closed with valve 7' opened, thus allowing passage of the vapors to lower vapor space 23 through branch line 10 having control valve 11.

For the introduction of the halogen acid such as, for example, hydrochloric acid, a pump 14 may be provided to produce a positive pressure on the incoming material which is supplied through line 12 containing a control valve 13 and discharged into line 15 containing control valves 16 and 16'. A branch line 17 containing a control valve 18 permits the introduction of the treating reagent into the vapors entering the lower vapor section of the treater or by operating with valve 16' open and valve 18 closed, the treating reagent may be conducted to line 8 and thence to the upper vapor space.

A number of different naturally occurring ores may be used as contact material. Some of these are sulphide ores, some silicates and some carbonates. It will be evident that the different ores will not be exact equivalents as regards their efficiency in promoting the reactions of treatment but in general the use of any particular type will depend upon the cost and availability considered in the light of its overall efficiency and life when in use.

The sulphide ore of zinc may at times be used, this ore being known as sphalerite or zinc blende. Ores of this character frequently contain traces of iron and manganese and sometimes cadmium and mercury. The iron at times may run as high at 18%, being present in isomorphous mixture with the zinc. In general, sulphide ore is not as efficient as the other ores presently to be mentioned but may possess at times a long period of moderate activity which renders its use practical.

Of the silicate ores, several may be mentioned. Willemite or Troostite occur with siliceous gangue material as zinc ortho silicate having the formula $Zn_2SiO_4$. These minerals may also contain iron and manganese partially replacing the zinc.

Another zinc silicate ore is the well known calamine having the general formula $H_2Zn_2SiO_5$ or $H_2O.2ZnO.SiO_2$.

Among the zinc carbonates may be mentioned smithsonite having the formula $ZnCO_3$. This mineral is frequently associated with other carbonate minerals such as the carbonates of iron and manganese and it occurs frequently with galena and sphalerite.

Another zinc ore of a combined carbonate and hydroxide character is aurichalcite $2(Zn, Cu)-CO_3.3(Zn, Cu)(OH)_2$.

Still another of this type of ore is hydrozincite, $ZnCO_3.2Zn(OH)_2$ or $2ZnO.Co_2.2H_2O$. This particular mineral is a variety of smithsonite and frequently occurs with it.

From the above particular cases the types of minerals which may act as efficient catalytic and contact material may be cleaned. These particular cases are merely typical and are given for purposes of illustration only. Ores containing minerals of still more complicated composition such as an ore found in some of the Rocky Mountain States, containing copper, zinc and lead, may also be employed and any of the ores which contain minerals of the types mentioned may contain widely varying amounts of siliceous or gangue materials, rendering some selection necessary when their applicability to a particular problem is a matter of consideration. The gangue may frequently act as spacing material itself.

Reactions involved in treating vapors containing undesirably large percentages of di and tri olefinic hydrocarbons are generally those of polymerization of such compounds to form high boiling polymers readily separable by distillation, the mono olefins being substantially unaffected. The amount of halogen acid which it is necessary to employ will vary somewhat with the nature of the vapors but in general it is of the order of from 0.1 to 1 lb. per bbl. of condensed gasoline later fractionated from the vapors undergoing treatment.

When vapors are treated by passing them upwardly through the contact masses a certain degree of fractionation may occur but in most instances the exact degree is best controlled by a subsequent fractionating device shown in the drawing as fractionator 31. In the case of downflow treatments practically no real fractionation is effected other than a rough separation of polymers and relatively high boiling components. The vapors resulting from upflow treatments may be removed from chamber 19 through line 25 containing control valve 26 and from downflow treatments through line 27 containing control valve 28, both lines leading to the tower vapor inlet line 29 and passing through valve 30 into the fractionator. The vapors from the fractionator follow the customary source, being passed through a vapor line 32 and a valve 33 to a condenser, 34, whence condensed liquids and cooled gases may be passed through line 35 containing control valve 36 to receiver 37. This receiver may have the customary gas release line 38 containing control valve 39 and a liquid draw line 40 containing control valve 41 for the removal of the finished product.

Polymer refluxes from treater 19 may be withdrawn from the bottom of the treater through line 42 and valve 43 to intermediate receiver 44, and similarly refluxes of the same general character may be withdrawn from the fractionator through line 45 containing control valve 46. Receiver 44 may have a vapor space connecting line 51 to permit return of gas back to the vapor space and prevent vapor lock. Receiver 44 is shown as having a draw line 47 containing a control valve 48 through which the polymer refluxes may be withdrawn and either returned to the fractionator or the cracking zone of the plant from which the vapors originated or put to some other use. At times an aqueous layer containing metallic salts or halogen acids may accumulate in this receiver and a line 49 containing a control valve 50 is shown to permit their proper disposal.

It has been found that ores containing minerals of metals which I have previously shown to have value in treatments of this charcter frequently possess superior advantages in assisting polymerizations in the presence of hydrochloric acid. This may be due to the better dissemination of the active catalytic component or the better retention of porous structure in the mass. In any event the advantages are frequently quite obvious in comparative experiments.

The temperatures and pressures essential for the best results are usually those obtaining in the vapors produced, the necessary time of contact being varied by changing the size and shape of the bed of contact material and the rate of treating reaction being varied to some extent by varying the amount of halogen acid. Reactions may furthermore be controlled as in my previous inventions of this character by the addition of minor amounts of oxidizing gases such as air, oxygen, ozone, etc.

The following tabulation of data will serve to indicate the comparative value of zinc ores as contact materials in comparison with brass turnings used for a similar purpose. The cracked vapors to which the process was applied in each case were produced by the cracking of a mixture of Mid-Continent aud West Texas residuum in approximately equal volumes. The vapors treated were of approximately gasoline end point as will be seen by a consideration of the figures and the same treating tower was used in each run. To obtain the figures shown in the first column a certain space in the tower was filled with brass turnings and the gasoline vapors were contacted after the addition of approximately ½ lb. of hydrochloric acid per bbl. of condensed gasoline. To obtain the figures shown in column 2 the space formerly occupied by the brass turnings was replaced by a zinc silicate ore containing principally the mineral Willemite, the total zinc content of the ore being 35% by weight. This material was used in lumps of approximately ½ in. in diameter. To obtain the figures shown in column 3 a zinc carbonate ore was used which contained only a relatively small amount of gangue material and contained 60% of zinc by weight. The same sized particles were used as in the case of the silicate ore.

*Small towers*

| Run number | 1 | 2 | 3 |
|---|---|---|---|
| Operating conditions in tower: | | | |
| Top temperature | 345° F. | 340° F. | 345° F. |
| Pressure | 28 lb. | 28 lb. | 28 lb. |
| Properties of products: | | | |
| Vapors to tower: | | | |
| End-point | 405 | 405 | 405 |
| Sulphur % weight | 0.22 | 0.22 | 0.22 |
| Gum—mg./100 cc, copper dish | 260 | 250 | 265 |
| Untreated gasoline: | | | |
| End-point | 390 | 385 | 392 |
| Color | 30+ | 30+ | 29 |
| Sunlight stability (color after 4 hrs.) | 30+ | 30+ | 27 |
| Caustic washed gasoline: | | | |
| Color | 30 | 30+ | 29 |
| Sunlight stability | 29+ | 30+ | 27+ |
| Gum—mg./100 cc | 0 | 0 | 0 |
| Sulphur % weight | 0.10 | 0.08 | 0.18 |
| Plumbite sweetened gasoline: | | | |
| Color | 29 | 30+ | 28 |
| Sunlight stability | 25 | 25 | 24 |
| Gum—mg | 20 | 2 | 30 |
| Tower packing | Brass | ZnSiO₃ | ZnS |

It will be seen that practically the same results are obtained when using the ores as when using the metal tower packing even though the vapor velocities were substantially equivalent which shows that the same results were obtained by the use of smaller quantities of metal. It has been indicated by duration tests that the falling off in activity of the ores occurs at a lower rate than that of the metals and that therefore the use of the ores is preferable for this reason in addition to its lower cost.

The foregoing specification involving a description of the process and the examples of experimental results given have sufficiently shown the nature of the invention and its commercial value, but neither the exact details of the disclosure nor the examples are to be construed as imposing limitations thereon.

I claim:

1. A process for the treatment of cracked hydrocarbons for the purpose of refining the same and to remove objectionable color and gum forming components which comprises subjecting the said hydrocarbons while in heated vaporous condition to the action of hydrochloric acid in contact with an ore of a metal selected from the group consisting of zinc, copper and lead.

2. A process for the treatment of cracked hydrocarbons for the purpose of refining the same and to remove objectionable color and gum forming components which comprises subjecting the said hydrocarbons while in heated vaporous condition to the action of hydrochloric acid in contact with an ore of copper.

3. A process for the treatment of cracked hydrocarbons for the purpose of refining the same and to remove objectionable color and gum forming components which comprises subjecting the said hydrocarbons while in heated vaporous condition to the action of hydrochloric acid in contact with an ore of zinc.

4. A process for the treatment of cracked hydrocarbons for the purpose of refining the same and to remove objectionable color and gum forming components which comprises subjecting the said hydrocarbons while in heated vaporous condition to the action of hydrochloric acid in contact with an ore of zinc and copper.

5. A process for refining hydrocarbon oil which comprises treating the oil with hydrochloric acid in the presence of an ore of a metal selected from the group consisting of zinc, copper and lead.

6. A process for refining hydrocarbon oil which comprises treating the oil with hydrochloric acid in the presence of an ore of zinc.

7. A process for refining hydrocarbon oil which comprises treating the oil with hydrochloric acid in the presence of an ore of copper.

8. A process for refining hydrocarbon oil which comprises treating the oil with hydrochloric acid in the presence of an ore of zinc and copper.

ROLAND B. DAY.